United States Patent
Koszek

(10) Patent No.: US 10,739,991 B2
(45) Date of Patent: Aug. 11, 2020

(54) SYSTEM AND METHOD OF PROVIDING AN OVERLAY USER INTERFACE FOR A TOUCHSCREEN DISPLAY

(71) Applicant: salesforce.com, inc., San Francisco, CA (US)

(72) Inventor: Wojciech A. Koszek, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 4 days.

(21) Appl. No.: 15/872,664

(22) Filed: Jan. 16, 2018

(65) Prior Publication Data

US 2019/0220184 A1    Jul. 18, 2019

(51) Int. Cl.
    *G06F 3/0488*    (2013.01)
    *G06F 40/103*    (2020.01)
    *G06F 3/0485*    (2013.01)
    *G06F 40/109*    (2020.01)

(52) U.S. Cl.
    CPC ........ *G06F 3/04883* (2013.01); *G06F 3/0485* (2013.01); *G06F 3/04886* (2013.01); *G06F 40/103* (2020.01); *G06F 40/109* (2020.01); *G06F 2203/04804* (2013.01)

(58) Field of Classification Search
    CPC ............. G06F 3/04883; G06F 3/04886; G06F 3/0485; G06F 17/214; G06F 40/109; G06F 40/103; G06F 2203/04804
    See application file for complete search history.

(56) References Cited

U.S. PATENT DOCUMENTS

| | | |
|---|---|---|
| 5,983,227 A | 11/1999 | Nazem et al. |
| 6,216,133 B1 | 4/2001 | Masthoff |
| 6,236,978 B1 | 5/2001 | Tuzhilin |
| 6,288,717 B1 | 9/2001 | Dunkle |
| 6,411,949 B1 | 6/2002 | Schaffer |
| 6,907,566 B1 | 6/2005 | McElfresh et al. |

(Continued)

OTHER PUBLICATIONS

Final Office Action for U.S. Appl. No. 12/437,418, dated Apr. 16, 2012.

(Continued)

*Primary Examiner* — Andrew T Chiusano
(74) *Attorney, Agent, or Firm* — LKGlobal | Lorenz & Kopf, LLP

(57) ABSTRACT

A computer-implemented method in an electronic device comprises: receiving a request to display a keyboard; in response, causing a touchscreen display to display, a multi-layer image comprising a virtual keyboard in a first layer and a text-box in a second layer; receiving a selection of a key from the virtual keyboard; and causing a character associated with the selected key to be displayed in the text-box. A keyboard module comprises one or more processors configured by programming instructions encoded on non-transient computer readable media and is configured to: provide a multi-layer image for display on a touchscreen display of the electronic device, the multi-layer image comprising a virtual keyboard in a first layer and a text-box in a second layer; receive a selection of a key from the virtual keyboard made via the touchscreen display; and cause a character associated with the selected key to be displayed in the text-box.

20 Claims, 2 Drawing Sheets

(56) References Cited

U.S. PATENT DOCUMENTS

| | | |
|---|---|---|
| 7,062,502 B1 | 6/2006 | Kesler |
| 7,100,111 B2 | 8/2006 | McElfresh et al. |
| 7,269,590 B2 | 9/2007 | Hull et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,644,122 B2 | 1/2010 | Weyer et al. |
| 7,668,861 B2 | 2/2010 | Steven |
| 7,747,648 B1 | 6/2010 | Kraft et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,945,653 B2 | 5/2011 | Zuckerberg et al. |
| 7,991,764 B2 | 8/2011 | Rathod |
| 8,005,896 B2 | 8/2011 | Cheah |
| 8,073,850 B1 | 12/2011 | Hubbard et al. |
| 8,103,611 B2 | 1/2012 | Tuzhilin et al. |
| 8,150,913 B2 | 4/2012 | Cheah |
| 8,166,013 B2 | 4/2012 | Bandaru et al. |
| 2008/0010270 A1 | 1/2008 | Gross |
| 2008/0147487 A1 | 6/2008 | Hirshberg |
| 2008/0209320 A1 | 8/2008 | Mawhinney et al. |
| 2010/0125502 A1 | 5/2010 | Solomon et al. |
| 2010/0211904 A1* | 8/2010 | Yun ................... G06F 3/0236 715/773 |
| 2010/0217757 A1 | 8/2010 | Fujioka |
| 2010/0241576 A1 | 9/2010 | Beeri |
| 2010/0323762 A1* | 12/2010 | Sindhu ................ G06F 1/1613 455/566 |
| 2011/0209067 A1 | 8/2011 | Bogess et al. |
| 2011/0258204 A1 | 10/2011 | Hubbard et al. |
| 2012/0084679 A1* | 4/2012 | Sirpal ................. G06F 1/1616 715/761 |
| 2012/0242582 A1* | 9/2012 | Choi ................... G06F 3/0233 345/169 |
| 2012/0290407 A1 | 11/2012 | Hubbard et al. |
| 2014/0306897 A1* | 10/2014 | Cueto ............... G06F 3/04883 345/173 |
| 2015/0143234 A1* | 5/2015 | Norris, III ............ G06F 17/24 715/256 |
| 2017/0038967 A1* | 2/2017 | Sotnikov ........... G06F 3/04886 |
| 2017/0052932 A1* | 2/2017 | Caines ............... G06F 17/2211 |

OTHER PUBLICATIONS

Final Office Action for U.S. Appl. No. 12/356,429, dated May 2, 2012.

Notice of Allowance for U.S. Appl. No. 12/819,402, dated May 14, 2012.

Non-Final Office Action for U.S. Appl. No. 13/453,802, dated Jun. 8, 2012.

\* cited by examiner

SYSTEM AND METHOD OF PROVIDING AN OVERLAY USER INTERFACE FOR A TOUCHSCREEN DISPLAY

TECHNICAL FIELD

Embodiments of the subject matter described herein relate generally to virtual keyboards, and more particularly to techniques for generating a virtual keyboard on a touchscreen display device.

BACKGROUND

Many electronic devices such as smartphones, portable audio players, tablet computers, e-readers, automobile panel displays, and control panels utilize a virtual keyboard on a touchscreen display for inputting text. The virtual keyboard may attempt to use the layout of a keyboard that was developed for a desktop computer. Because the screen size of the touchscreen display for many electronic devices is small, the virtual keyboard displayed thereon may be small. The virtual keys of the virtual keyboard may be small and arranged close together. The virtual keyboards may not be optimized for use on the limited screen size available on many electronic devices.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
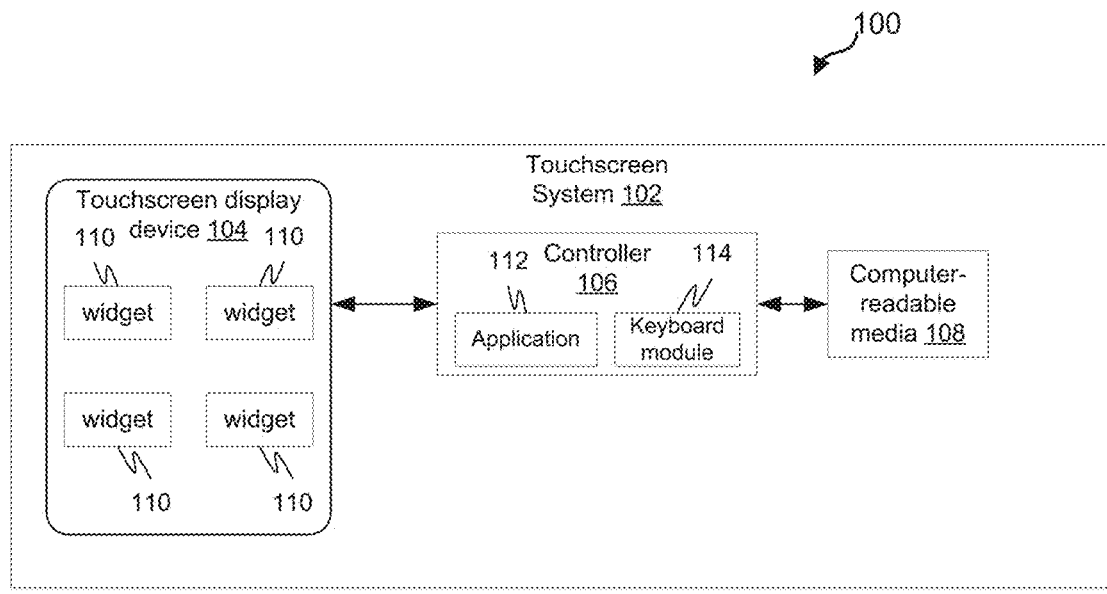
FIG. 1 is a block diagram depicting an example electronic device that can implement aspects of the current subject matter, in accordance with some embodiments.

FIG. 1 is a block diagram depicting an example electronic device 100 that can implement aspects of the current subject matter. The example electronic device 100 includes a touchscreen system 102 for inputting and outputting data. The example touchscreen system 102 includes a touchscreen display device 104, a touchscreen controller 106, and computer-readable media 108. The example touchscreen display device 104 includes a touchscreen surface layered over a visual display. The touchscreen surface is configured to receive user input through single-touch or multi-touch gestures. The visual display is configured to display a graphical user interface (GUI) generated by the controller 106. The GUI may provide one or more widgets 110 for display that may allow for selecting an application 112 to operate on the touchscreen system or may allow for displaying, entering and/or editing data.

The example controller 106 includes at least one processor and can access one or more computer-readable storage devices or media 108. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller 106, a semiconductor-based microprocessor (in the form of a microchip or chip set), any combination thereof, or generally any device for executing instructions.

The computer readable storage device or media 108 may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 106.

The processors and memory of the example controller 106 and computer readable storage media 108 are configured by the executable programming instructions to provide one or more executable applications programs 112. The example application programs 112 when executing may cause the generation of a GUI containing widgets 110 and other graphical elements on the visual display of the touchscreen display device 104.

The processors and memory of the example controller 106 and computer readable storage media 108 are also configured by programming instructions to provide a keyboard module 114. The keyboard module 114 when enabled is configured to cause the generation and display of a multi-layer keyboard image on the visual display of the touchscreen display device 104. The multi-layer keyboard image may include a virtual keyboard in a first layer and a text-box in a second layer that overlays the first layer, wherein the virtual keyboard in the first layer and the content of the text-box in the second layer are simultaneously visible. The multi-layer keyboard image when enabled may display a virtual keyboard across substantially all of the visual display of the touchscreen display device 104. The text-box overlay layer may allow for the display of character data that may be entered using the virtual keyboard as well as other character data that may be intended to be viewed when the multi-layer keyboard image was enabled. The multi-layer keyboard image may be enabled in response to the selection of a widget 110. A widget 110 may be selected or put in focus by a touch gesture on the touchscreen surface of the touchscreen display device 104.

Figure 2:
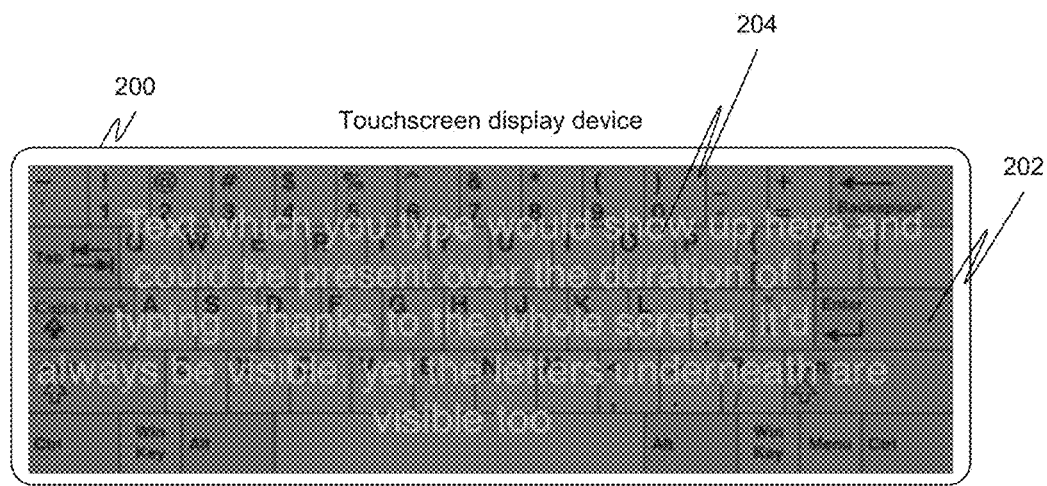
FIG. 2 is a block diagram illustrating an example image of an example multi-layer keyboard image on a touchscreen device, in accordance with some embodiments.

FIG. 2 is a block diagram illustrating an example image of an example multi-layer keyboard image on a touchscreen device 200. The example multi-layer keyboard image includes a virtual keyboard 202 in a first layer and a text-box that includes text 204 in a second layer that overlays the first layer, wherein the virtual keyboard in the first layer and the content of the text-box in the second layer are simultaneously visible. In this example, the virtual keyboard extends across substantially all of the visual display of the touchscreen device 200. The example text-box overlay layer includes text 204 that may be entered using the virtual keyboard as well as other character data that may be intended to be viewed when the multi-layer keyboard image was enabled.

The touchscreen device may be one of many different types of electronic devices. The electronic devices may include devices capable of communications, data processing and/or utility. Examples include handheld, lightweight electronic devices, such as smartphones, tablet computers, and e-readers, small devices, such as portable audio players and electronic toys, and other devices, such as automobile panels and control panels.

Many electronic devices have a small screen size and may utilize a virtual keyboard that does not extend across substantially all of the visual display of the electronic device. Some of the screen space may be reserved for a virtual keyboard and other parts of the screen space may be reserved for a text-box. Because of the small screen size and the virtual keyboard not using all of the available screen space on the electronic device, the displayed virtual keyboard on the electronic device may be too small to allow a user to accurately type on it. The multi-layer keyboard image described herein allows for a larger virtual keyboard to be displayed on the electronic device.

The different layers of the multi-layer keyboard image may be made more distinguishable to a viewer of the electronic device display by using various techniques. As an example, different colors and/or color shades may be used to allow a virtual keyboard on a lower layer to be visible while a text box on an upper layer is also visible. Unaccented (Lighter) colors can be used on a lower layer while brighter and darker colors may be used on upper layers. If more than one upper layer is used, distinguishing features such as text color, lateral position of text in a display (e.g., text in one layer may occupy a left half of a display area and text in another layer may occupy a right half of a display area), and font characteristic (e.g., size, style, bolding, etc.) may be used to distinguish text in one layer from text in another layer.

The multi-layer keyboard image may be enabled when an application on a touchscreen device is enabled. In one example scenario in which the multi-layer keyboard is used with a messaging application, when the messaging application is enabled, the application can open the multi-layer keyboard with the virtual keyboard perpetually maximized across the entire display surface. Messages that are received may be displayed in a text-box in an upper layer. Messages that are typed via the virtual keyboard for sending may also be displayed in a text-box in an upper layer (e.g., the same upper layer or a different upper layer as the layer that displays the messages that are received). The virtual keyboard via taps on the touchscreen may generate characters which are forwarded to a text-box for display.

In this example, the received messages may be presented in one color and the sent messages may be presented in a different color. Other distinguishing characteristics such as the lateral position of received messages versus the lateral position of the sent messages, different font characteristics being applied to the sent messages and the received messages, and others may be used to distinguish the sent messages from the received messages.

In this example, when a message is typed and sent (e.g., by tapping the enter key on the virtual keyboard), the virtual keyboard remains ready for the entry of additional text in a text-box. A text-box does not have to be placed in focus to make the virtual keyboard visible or to enable use of the virtual keyboard in this example. The virtual keyboard can be enabled on the whole screen all the time, allowing for larger buttons, making it easier for a user to use the keyboard without erroneously touching keys.

The multi-layer keyboard image may also be enabled within an application when a widget generated by the application is selected or put in focus. The multi-layer keyboard image could be used for all application fields that require typing. The multi-layer keyboard image could be applied to any other interface element such as buttons, icons, or other graphical elements.

Different types of touch gestures may be assigned to the different layers in the multi-layer keyboard. As an example, a first type of touch gesture (e.g., a tap gesture) made on a touchscreen display may be assigned to the virtual keyboard and a second type of touch gesture (e.g., a swipe gesture) may be assigned to a text-box. Consequently, when a touch gesture is made on the touchscreen display, the multi-layer keyboard may know the layer to which the touch gesture should be applied. The multi-layer keyboard may know that a tap gesture should correspond to a key on the virtual keyboard and a swipe gesture may be an indication to perform some action on the text-box such as scrolling up or down through the text-box.

Figure 3:
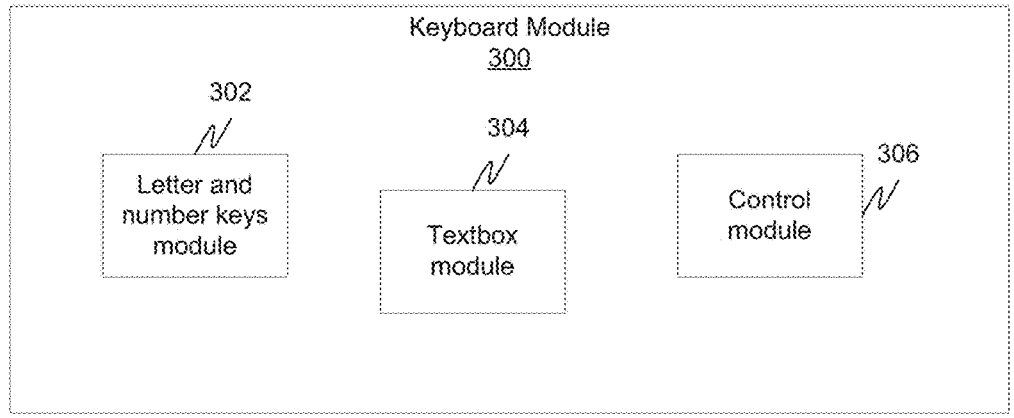
FIG. 3 is a block diagram depicting an example keyboard module that may execute within a touchscreen system, in accordance with some embodiments.

FIG. 3 is a block diagram depicting an example keyboard module 300 that may execute within a touchscreen system. The example keyboard module 300 comprises one or more processors configured by programming instructions encoded in non-transient computer readable media. The example keyboard module 300 includes a letter and number keys module 302, a text-box module 304, and a control module 306. The example letter and number keys module 302 is configured to display letter and number keys for a virtual keyboard in a lower layer in a multi-layer keyboard for display on the visual display of a touchscreen device. The example text-box module 304 is configured to display a text-box in an upper layer of the multi-layer keyboard that overlays the virtual keyboard. The control module 306 is configured to control the functioning of the keyboard module 300 such as assigning different touch gestures to different layers, determining which key of the virtual keyboard was engaged, and identifying a character to send to the text-box in response to a key stroke on the virtual keyboard.

Using the letter and number keys module 302, the textbox module 304, and the control module 310, the example keyboard module 300 is configured to display, via a visual display in the touchscreen system, a virtual keyboard with a text-box in an overlay above the virtual keyboard, wherein the virtual keyboard and the content of the text-box are simultaneously visible.

Figure 4:
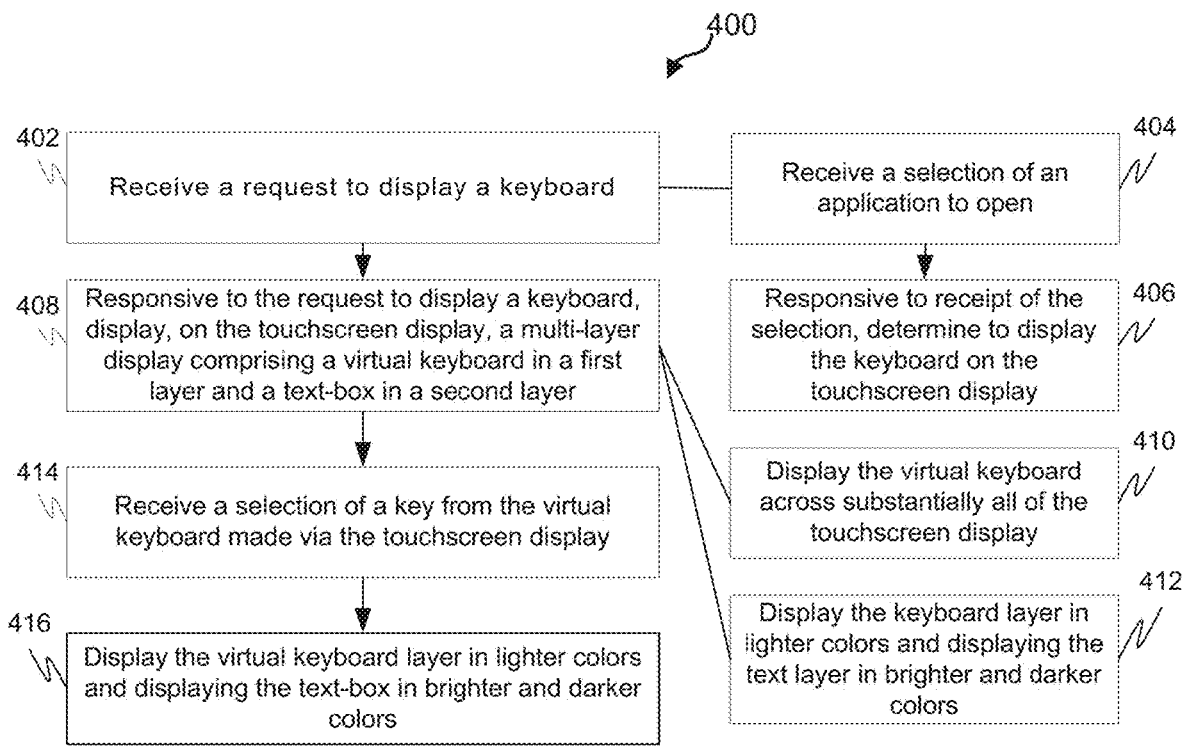
FIG. 4 is a process flow chart depicting an example process performed in an example electronic device for generating a multi-layer keyboard on a touchscreen display, in accordance with some embodiments.

FIG. 4 is a process flow chart depicting an example process 400 performed in an example electronic device for generating a multi-layer keyboard on a touchscreen display. The order of operation within the example process 400 is not limited to the sequential execution as illustrated in the figure, but may be performed in one or more varying orders as applicable and in accordance with the present disclosure.

The example process 400 includes receiving a request to display a keyboard. (operation 402). Receiving a request to display a keyboard may involve receiving a selection of an application to open (operation 404) and responsive to receipt of the selection, determining to display the keyboard on the touchscreen display (operation 406). The request to display a keyboard may also be made within an application when a widget or other object generated by the application is selected or put in focus.

Responsive to the request to display a keyboard, the example process 400 includes displaying, on the touchscreen display, a multi-layer image comprising a virtual keyboard in a first layer and a text-box in a second layer, wherein the virtual keyboard in the first layer and the content of the text-box in the second layer are simultaneously visible (operation 408). Displaying a multi-layer image comprising a virtual keyboard may include displaying the virtual keyboard across substantially all of the touchscreen display (operation 410). Displaying a multi-layer image comprising a virtual keyboard in a first layer and a text-box in a second layer may also include displaying the keyboard layer in lighter colors and displaying the text layer in brighter and darker colors (operation 412). This may allow the various layers to be more distinguishable from one another.

The example process 400 further includes receiving a selection of a key from the virtual keyboard made via the touchscreen display (operation 414) and displaying a character associated with the selected key in the text-box (operation 416). This can allow a user to view text that is inputted via the virtual keyboard while the virtual keyboard remains visible underneath the text.

The subject matter described herein discloses apparatus, systems, techniques and articles for improving the functioning of a touchscreen system by providing a keyboard in multiple layers as a multi-layer keyboard with a virtual keyboard in one layer and a text-box in another layer. The virtual keyboard can be maximized to expand across substantially all of the display surface of the touchscreen display and still display typed text in a text-box in another visible layer.

In one embodiment, a computer-implemented method for causing the display of a keyboard on an electronic device having a touchscreen display is provided. The method comprises: receiving a request to display a keyboard; responsive to the request to display a keyboard, causing the touchscreen display to display a multi-layer image comprising a virtual keyboard in a first layer and a text-box in a second layer that overlays the first layer, wherein the virtual keyboard in the first layer and the content of the text-box in the second layer are simultaneously visible; receiving a selection of a key from the virtual keyboard made via the touchscreen display; and causing a character associated with the selected key to be displayed in the text-box that overlays the virtual keyboard.

These aspects and other embodiments may include one or more of the following features. Receiving a request to display a keyboard may comprise receiving a selection of an application to open and responsive to receipt of the selection determining to cause the keyboard to be displayed on the touchscreen display. The method may further comprise applying a first type of touch gesture made on the touchscreen display to the virtual keyboard and a second type of touch gesture to the text-box. Applying a first type of touch gesture made on the touchscreen display to the virtual keyboard and a second type of touch gesture to the text-box may comprise applying a tap gesture to the virtual keyboard and applying a swipe gesture to the text-box. The method may further comprise: retrieving text saved by the application; and causing the saved text in the text-box to be displayed using a distinguishing feature that distinguishes the saved text from text entered via the virtual keyboard. Causing the saved text in the text-box to be displayed using a distinguishing feature may comprise: causing the saved text to be displayed in a first color and causing the entered text to be displayed in a second color that is different from the first color; causing the saved text to be displayed in a first lateral section in the text box and causing the entered text to be displayed in a second lateral section that is different from the first lateral section; or causing the saved text to be displayed using a first font characteristic (e.g., font size or font style) and causing the entered text to be displayed using a second font characteristic that is different from the first font characteristic. Causing the touchscreen display to display a multi-layer image comprising a virtual keyboard in a first layer may comprise causing the virtual keyboard to be displayed across substantially all of the touchscreen display. The method may further comprise: responsive to a swipe gesture, causing text in the text-box to scroll up or down. Causing the touchscreen display to display a multi-layer image comprising a virtual keyboard in a first layer and a text-box in a second layer may comprise causing the virtual keyboard layer to be displayed in lighter colors and causing the text-box to be displayed in brighter and darker colors. The method may further comprise displaying, on the touchscreen display, a second text-box in a third layer of the multi-layer image; retrieving text saved by the application; and causing the saved text to be displayed in the second text-box. The method may further comprise: causing the virtual keyboard to be displayed using a first distinguishing feature; causing the content of the text-box to be displayed using a second distinguishing feature; and causing the content of the second text-box to be displayed using a third distinguishing feature.

In another embodiment, a keyboard module in an electronic device is provided. The keyboard module comprises one or more processors configured by programming instructions encoded on non-transient computer readable media in the electronic device. The keyboard module is configured to: provide a multi-layer image for display on a touchscreen display of the electronic device, the multi-layer image comprising a virtual keyboard in a first layer and a text-box in a second layer that overlays the first layer, wherein the virtual keyboard in the first layer and the content of the text-box in the second layer are simultaneously visible; receive a selection of a key from the virtual keyboard made via the touchscreen display; and cause a character associated with the selected key to be displayed in the text-box that overlays the virtual keyboard.

These aspects and other embodiments may include one or more of the following features. The keyboard module may be configured to provide an interface that distinguishes between types of touch gestures made on the touchscreen display of the electronic device wherein a first type of touch gesture may be applied to the virtual keyboard and a second type of touch gesture may be applied to the text-box. The first type of touch gesture may include tap gestures and the second type of touch gesture may include swipe gestures. The virtual keyboard may be configured to be displayed across substantially all of the touchscreen display. The keyboard module may be further configured to, responsive to a swipe gesture, scroll up or down through the text-box. The first layer may be configured to be displayed in lighter colors and the second layer may be configured to be displayed in brighter and darker colors. The keyboard module may be further configured to: retrieve text saved by the application; and cause the saved text in the text-box to be displayed using a distinguishing feature that distinguishes the saved text from text entered via the virtual keyboard. The keyboard module may be configured to: cause the saved text to be displayed in a first color and cause the entered text to be displayed in a second color that is different from the first color; cause the saved text to be displayed in a first lateral section in the text box and cause the entered text to be displayed in a second lateral section that is different from the first lateral section; or cause the saved text to be displayed using a first font characteristic and cause the entered text to be displayed using a second font characteristic that is different from the first font characteristic.

In another embodiment, a non-transitory computer readable storage medium embodying programming instructions configurable to perform a method is provided. The method comprises, responsive to a request to display a keyboard on an electronic device having a touchscreen display, causing the touchscreen display to display a multi-layer image comprising a virtual keyboard in a first layer and a text-box in a second layer that overlays the first layer, wherein the virtual keyboard in the first layer and the content of the text-box in the second layer are simultaneously visible; receiving a selection of a key from the virtual keyboard made via the touchscreen display; and displaying a character associated with the selected key in the text-box that overlays the virtual keyboard.

These aspects and other embodiments may include one or more of the following features. Causing the touchscreen display to display a multi-layer image comprising a virtual keyboard in a first layer and a text-box in a second layer may comprise causing the virtual keyboard to be displayed across substantially all of the touchscreen display. The method may further comprise applying a first type of touch gesture made on the touchscreen display to the virtual keyboard and applying to the text-box a second type of touch gesture that is different from the first type of touch gesture.

In another embodiment, a computer-implemented method in an electronic device having a touchscreen display is provided. The method comprises: responsive to a request to display a keyboard, causing the touchscreen display to display a multi-layer image comprising a keyboard layer and a text layer, wherein the keyboard layer and the text layer are simultaneously visible; and applying a first type of touch gesture made on the touchscreen display to the keyboard layer and a second type of touch gesture to the text layer.

These aspects and other embodiments may include one or more of the following features. Causing the touchscreen display to display, a multi-layer image comprising a keyboard layer and a text layer may comprise causing the keyboard layer to be displayed on a lower layer and the text layer to be displayed on an upper layer. Applying a first type of touch gesture made on the touchscreen display to the keyboard layer and a second type of touch gesture to the text layer may comprise applying a tap gesture to the keyboard layer and applying a swipe gesture to the text layer. Causing the touchscreen display to display a multi-layer image comprising a keyboard layer and a text layer may comprise causing the keyboard layer to be displayed across substantially all of the touchscreen display. Causing the touchscreen display to display a multi-layer image comprising a keyboard layer and a text layer may comprise causing a virtual keyboard to be displayed in one layer and a text-box to be displayed in an overlay layer. The method may further comprise: receiving a selection of a key from the virtual keyboard made via the touchscreen display; and causing a character associated with the selected key to be displayed in the text-box. The method may further comprise, responsive to a swipe gesture, causing the text in the text-box to scroll up or down. Causing the touchscreen display to display a multi-layer image may comprise causing the keyboard layer to be displayed in lighter colors and causing the text layer to be displayed in brighter and darker colors.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to touchscreen systems, touch gestures, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computer-implemented method for causing the display of a keyboard on an electronic device having a touchscreen display, the method comprising:
   receiving a request to display a keyboard;
   responsive to the request to display a keyboard, causing the touchscreen display to display a multi-layer image comprising a virtual keyboard in a first layer and a text-box in a second layer that overlays the first layer, wherein the virtual keyboard in the first layer and the content of the text-box in the second layer are simultaneously visible, wherein the virtual keyboard includes a plurality of virtual alphabetic keys with each of the plurality of virtual alphabetic keys associated with a single alphabetic letter and not a number and wherein the virtual keyboard includes a plurality of virtual numeric keys with each of the plurality of virtual numeric keys associated with a single number and not multiple numbers or an alphabetic letter, wherein the text-box overlays at least a portion of each virtual key of the virtual keyboard;
   receiving a selection of a key from the virtual keyboard made via the touchscreen display; and
   causing a character associated with the selected key to be displayed in the text-box that overlays the virtual keyboard, wherein selection of the key from the virtual keyboard does not cause the character associated with the selected key to be displayed in an area of the touchscreen display that does not overlay the virtual keyboard and wherein the touchscreen display does not have areas reserved for the display of entered characters that are not overlaid on the virtual keyboard.

2. The method of claim 1, further comprising applying a first type of touch gesture made on the touchscreen display to the virtual keyboard and a second type of touch gesture to the text-box.

3. The method of claim 2, wherein applying a first type of touch gesture made on the touchscreen display to the virtual keyboard and a second type of touch gesture to the text-box comprises applying a tap gesture to the virtual keyboard and applying a swipe gesture to the text-box.

4. The method of claim 1, further comprising:
   retrieving text saved by the application; and
   causing the saved text in the text-box to be displayed using a distinguishing feature that distinguishes the saved text from text entered via the virtual keyboard.

5. The method of claim 4, wherein displaying the saved text in the text-box using a distinguishing feature comprises:
   causing the saved text to be displayed in a first color and causing the entered text to be displayed in a second color that is different from the first color;
   causing the saved text to be displayed in a first lateral section in the text box and causing the entered text to be displayed in a second lateral section that is different from the first lateral section; or
   causing the saved text to be displayed using a first font characteristic and causing the entered text to be displayed using a second font characteristic that is different from the first font characteristic.

6. The method of claim 1, wherein causing the touchscreen display to display a multi-layer image comprising a virtual keyboard in a first layer comprises causing the virtual keyboard to be displayed across at least ninety percent of the touchscreen display.

7. The method of claim 1, further comprising:
   responsive to a swipe gesture, causing text in the text-box to scroll up or down.

8. The method of claim 1, wherein causing the touchscreen display to display a multi-layer image comprising a virtual keyboard in a first layer and a text-box in a second layer comprises causing the virtual keyboard layer to be displayed in one or more colors with a tint and causing the text-box to be displayed in one or more colors that are relatively lighter or darker than the one or more colors with a tint in which the virtual keyboard layer is displayed.

9. A keyboard module in an electronic device, the keyboard module comprising one or more processors configured by programming instructions encoded on non-transient computer readable media in the electronic device, the keyboard module configured to:
   provide a multi-layer image for display on a touchscreen display of the electronic device, the multi-layer image comprising a virtual keyboard in a first layer and a text-box in a second layer, wherein the virtual keyboard in the first layer and the content of the text-box in the second layer are simultaneously visible, wherein the virtual keyboard includes a plurality of virtual alphabetic keys with each of the plurality of virtual alphabetic keys associated with a single alphabetic letter and not a number and wherein the virtual keyboard includes a plurality of virtual numeric keys with each of the plurality of virtual numeric keys associated with a single number and not multiple numbers or an alphabetic letter, wherein the text-box overlays at least a portion of each virtual key of the virtual keyboard;
   receive a selection of a key from the virtual keyboard made via the touchscreen display; and
   cause a character associated with the selected key to be displayed in the text-box, wherein selection of the key from the virtual keyboard does not cause the character associated with the selected key to be displayed in an area of the touchscreen display that does not overlay the virtual keyboard and wherein the touchscreen display does not have areas reserved for the display of entered characters that are not overlaid on the virtual keyboard.

10. The keyboard module of claim 9, wherein the keyboard module is configured to provide an interface that distinguishes between types of touch gestures made on the touchscreen display of the electronic device wherein a first type of touch gesture is applied to the virtual keyboard and a second type of touch gesture is applied to the text-box.

11. The keyboard module of claim 10, wherein the first type of touch gesture includes tap gestures and the second type of touch gesture includes swipe gestures.

12. The keyboard module of claim 9, wherein the virtual keyboard is configured to be displayed across at least ninety percent of the touchscreen display.

13. The keyboard module of claim 9, further configured to:
responsive to a swipe gesture, scroll up or down through the text-box.

14. The keyboard module of claim 9, further configured to:
retrieve text saved by the application; and
cause the saved text in the text-box to be displayed using a distinguishing feature that distinguishes the saved text from text entered via the virtual keyboard.

15. The keyboard module of claim 14, wherein the keyboard module being configured to cause the saved text in the text-box to be displayed using a distinguishing feature comprises the keyboard module being configured to:
cause the saved text to be displayed in a first color and cause the entered text to be displayed in a second color that is different from the first color;
cause the saved text to be displayed in a first lateral section in the text box and cause the entered text to be displayed in a second lateral section that is different from the first lateral section; or
cause the saved text to be displayed using a first font characteristic and cause the entered text to be displayed using a second font characteristic that is different from the first font characteristic.

16. A non-transitory computer readable storage medium embodying programming instructions configurable to perform a method, the method comprising:
responsive to a request to display a keyboard on an electronic device having a touchscreen display, causing the touchscreen display to display a multi-layer image comprising a virtual keyboard in a first layer and a text-box in a second layer, wherein the virtual keyboard in the first layer and the content of the text-box in the second layer are simultaneously visible, wherein the virtual keyboard includes a plurality of virtual alphabetic keys with each of the plurality of virtual alphabetic keys associated with a single alphabetic letter and not a number and wherein the virtual keyboard includes a plurality of virtual numeric keys with each of the plurality of virtual numeric keys associated with a single number and not multiple numbers or an alphabetic letter, wherein the text-box overlays at least a portion of each virtual key of the virtual keyboard;
receiving a selection of a key from the virtual keyboard made via the touchscreen display; and
causing a character associated with the selected key to be displayed in the text-box, wherein selection of the key from the virtual keyboard does not cause the character associated with the selected key to be displayed in an area of the touchscreen display that does not overlay the virtual keyboard and wherein the touchscreen display does not have areas reserved for the display of entered characters that are not overlaid on the virtual keyboard.

17. The non-transitory computer readable media of claim 16, wherein causing the touchscreen display to display a multi-layer image comprising a virtual keyboard in a first layer and a text-box in a second layer comprises causing the virtual keyboard to be displayed across at least ninety percent of the touchscreen display.

18. The non-transitory computer readable media of claim 16, wherein the method further comprises applying a first type of touch gesture made on the touchscreen display to the virtual keyboard and a second type of touch gesture to the text-box.

19. The non-transitory computer readable media of claim 18, wherein applying a first type of touch gesture made on the touchscreen display to the virtual keyboard and a second type of touch gesture to the text-box comprises applying a tap gesture to the virtual keyboard and applying a swipe gesture to the text-box.

20. The non-transitory computer readable media of claim 16, wherein the method further comprises retrieving text saved by the application and causing the saved text in the text-box to be displayed using a distinguishing feature that distinguishes the saved text from text entered via the virtual keyboard, wherein displaying the saved text in the text-box using a distinguishing feature comprises:
causing the saved text to be displayed in a first color and causing the entered text to be displayed in a second color that is different from the first color;
causing the saved text to be displayed in a first lateral section in the text box and causing the entered text to be displayed in a second lateral section that is different from the first lateral section; or
causing the saved text to be displayed using a first font characteristic and causing the entered text to be displayed using a second font characteristic that is different from the first font characteristic.

* * * * *